United States Patent Office 3,452,467
Patented July 1, 1969

3,452,467
FISHING DEVICES
Soichiro Makino, 68, 1-chome Higashimachi,
Tokyo, Japan
Filed Mar. 6, 1967, Ser. No. 620,875
Claims priority, application Japan, Mar. 9, 1966,
41/14,019
Int. Cl. A01k 97/12, 87/00
U.S. Cl. 43—17                                    1 Claim

ABSTRACT OF THE DISCLOSURE

A fishing device comprising a fishing line connected to a fishing rod to depend in a body of water, the fishing line including two mutually insulated conductor wires, an automatic switch means adapted to be attached to one end of the fishing line to interconnect the two conductor wires through the body of water when a fish is caught by a fish hook attached to the switch means, means to indicate the fact that the fish is caught by the hook, a manually operable means for transmitting through the fishing line to the fish caught by the hook an electric current to bring it to the syncopic state.

Cross-reference to related application

Applicant's U.S. patent application Ser. No. 468,780, filed July 1, 1965, now abandoned.

Background of the invention

This invention relates to a novel fishing device constructed such that an electric shock is given to a fish caught by a fishing hook.

It has already been proposed to easily pull in a relatively big fish by putting it in a syncopic state by passing electric current therethrough. In one prior arrangement the circuit is constructed such that strong electric shocks, such as alternating current impulses, are passed between one electrode which is dipped in water and the other electrode which leads to a fishing hook via a fishing line after a fish is caught by the hook.

However, in such a well-known conventional arrangement it is necessary to detect the fact that a fish is caught by the hook by the movement of a float or delicate motions imparted to a fishing rod so that there is a fear of passing electric current through the fishing hook by operating an electric switch even when the fish is not yet actually caught by the hook or when some floating matters happn to come in contact with the fishing hook or the fishing line. In such a case fishes which are swimming close to the fishing hook would be repelled by the electric current and would go away from the fishing hook.

Summary of the invention

The fishing device according to this invention which has two mutually insulated wires covered by an electric insulated sheath as a fishing line. The conductor wires are respectively connected to contact members arranged in an automatic switch means to interconnect said two conductor wires through said body of water when a fish is caught by a fishing hook attached to said fishing line. The other ends of the conductor wires are connected to an electric circuit which comprises a relay circuit adapted to energize an indicating means, the electric source circuit generating an electric pulse to the fish through the fishing hook. The electric pulse is transmitted to the conductor wires through a manually operable means.

An object of this invention is to provide a novel fishing device which can effectively transmit electric pulses generated by a pulse generating apparatus to a fish caught by the fishing hook thus positively and effectively bringing the fish to a syncopic state.

Another object of this invention is to provide a novel fishing device provided with an electrical indicating means which operates to detect and inform the operator the fact that a fish is caught by a hook thus enabling the fisherman to reel in the line.

A further object of this invention is to provide a novel fishing device convenient to carry which effectively transmits faint pulse current to the fish with a small loss thus enabling the pulse generating mechanism and the source of power to be minimized.

A still further object of this invention is to provide a fishing device capable of minimizing the level of the pulse current necessary for bringing a fish to a syncopic state by effectively transmitting the pulse current to the fish caught by the fishing hook and yet has a high degree of operation safeness.

The features of the invention which are believed to be novel are set forth with particularity in the appended claim. The invention itself, however, as to its organization together with further objects and advantages thereof, may best be understood by reference to the following description taken in connection with the accompanying drawings.

Description of the preferred embodiments

Figure 1:
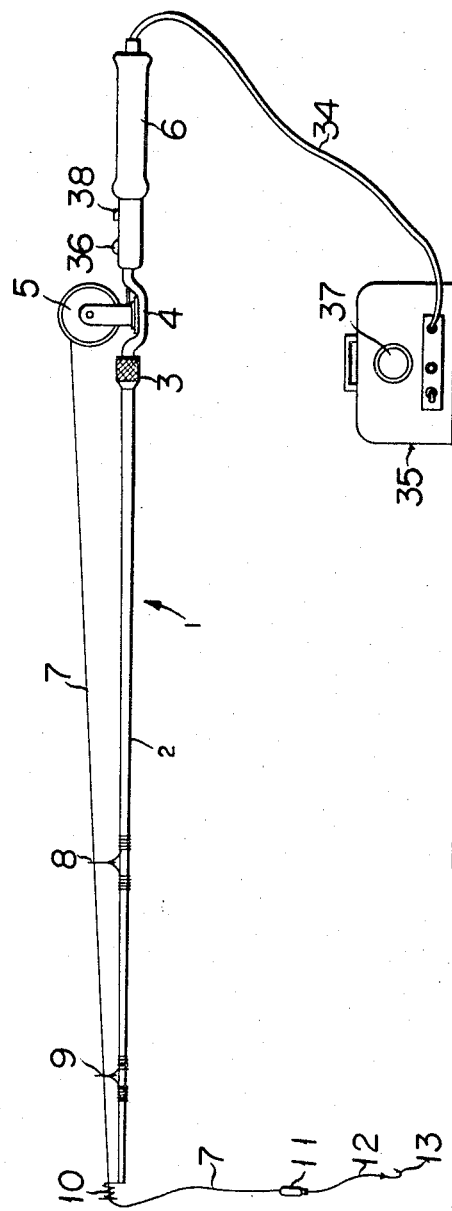
FIG. 1 shows a side elevation of a fishing device according to this invention.

Referring now to the accompanying drawings, a fishing rod 1 shown in FIG. 1 comprises a flexible rod 2 made of resilient metal, plastic or glass fibers treated with a plastic, a substantially U-shaped rigid member connected to the rear end of the flexible rod 2 by means of a fitting 3, a reel 5 rotatably supported by said rigid member 4 and a handle 6 secured to said rigid member 4. A fishing line 7 comprising two conductor wires which are insulated from each other and are protected by an outer insulating sheath is wound upon the reel 5, one end of said fishing line extending from the outer tip of the fishing rod through suitable guides 8, 9 and 10 mounted on the upper side of the rod. On the free end of the fishing line 7 is connected any automatic switch means 11 through which a fishing hook 13 is connected to the fishing line 7 by way of an electric conductor 12 consisting of an electric conductor wire covered by an electric insulating sheath. The diameter as well as the material of the fishing line 7 should be selected to have approximately the same appearance and feeling as the line 12 having the same construction as the conventional fishing line. For example, the fishing line may comprise a core of a material having high tensile strength, nylon, for example, a metal wire of foil of high electric conductivity spirally wound on the core, a suitable insulation layer applied thereon, an additional metal wire or foil similarly wound spirally upon the insulation layer, and an outermost insulation sheath covering the additional conductor. Such a fishing line is more advantageous than conventional fishing line when it is subjected to a strong tension because there is no fear that the thin metal wire or foil usually having a relatively small elongation would be damaged or broken.

Figure 2:
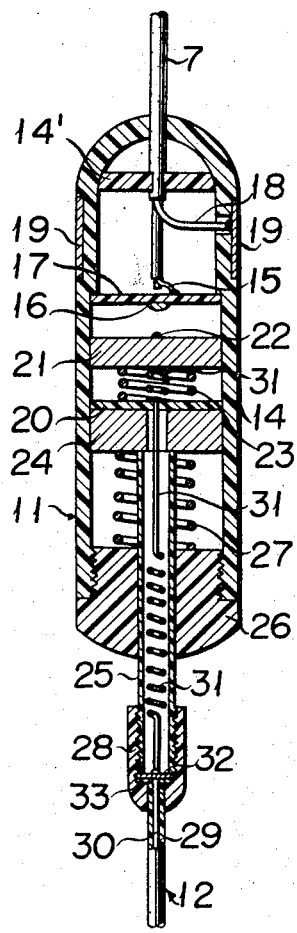
FIG. 2 is a longitudinal sectional view of an automatic switch means in its opened state utilized in the fishing device of this invention.
Figure 3:
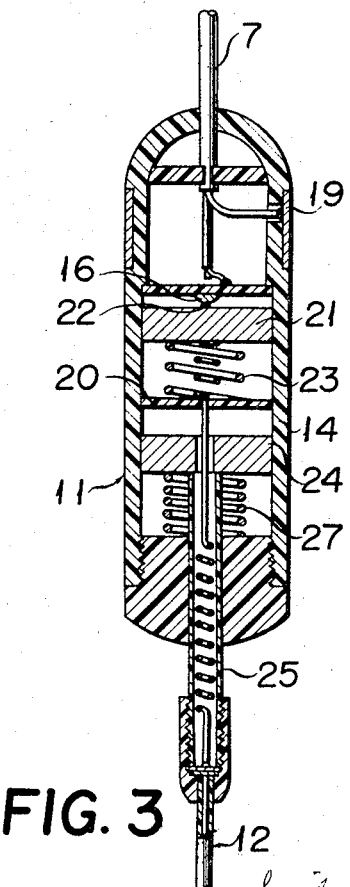
FIG. 3 is a similar view to FIG. 2 but in the closed state.

The detail of the construction and operation of the automatic switch means 11 connected to the free end of said fishing line are shown in FIGS. 2 and 3. More particularly the switching means shown comprises a tubular casing 14 made of a suitable insulating material which is provided with an opening at its one end through which is inserted the free end of the fishing line 7 to be firmly secured to a metal plate 14′. An electrical conductor 15 exposed at the free end of the fishing line which is inserted into the casing 14 is electrically connected to a metal plate 17 which is fixed to the inner wall of the casing 14 and is provided with a contact 16, whereas the other conductor wire 18 is connected to an electrode 19 provided on the outer periphery of the casing 14. A switching element in the form of a circular disc-shaped permanent magnet 21 is disposed in the casing to be slidable in the longitudinal direction in a space between the plate 17 and a partition plate 20 spaced therefrom. On the upper end of the permanent magnet 21 is secured an electric contact 22 adapted to cooperate with the contact 16. The switching element 21 is normally urged toward the plate 17 by a coil spring 23 interposed between the partion plate 20 and the switching element 21.

A movable element 24 in the form of a permanent magnet which is slidable in the longitudinal direction is housed in the casing 14 on the side of the partition plate 20 opposite to said switching element 21 and a cylinder 25 made of an electrical insulator and fixed to the movable element 24 extends in a liquid-tight fashion through an opening of a cap member 26 secured to the lower end of the casing. The movable member 24 is normally biased against the partition plate 20 by means of a coil spring 27 interposed between the member 24 and the cap member 26. On the tip of the cylinder 25 extending through the casing 14 is removably mounted an insulator cap 28 by threaded engagement, said cap 28 being connected to an electric conductor line 12 which comprises a conductor wire 30 covered by an insulator sheath 29. As shown, the electrical connection between the lead wire 31 and the conductor wire 30 is established by a pair of contact members 32 and 33 provided in the cap 28.

The polarities of the permanent magnets which comprise the switching member 21 and the movable member 24 are selected such that they attract each other.

Since in the normal condition shown in FIG. 2 wherein no force is acting upon the electric conductor line 12 to move it away from the casing 14, the movable member 24 which cooperates with the line 12 is forced against the partition plate 20 by means of the spring 27, the switching element 21 will be attracted toward the movable element 24 by a magnetic force which is larger than the force of the spring 23. As a result contacts 16 and 22 are maintained in the separated condition.

When the cylinder 25 is partially withdrawn from the casing 14 by a force sufficiently large enough to overcome the force of the spring 27, the distance between the switching element 21 and the movable element 24 would be increased gradually to weaken the magnetic force acting therebetween. When the movable element 24 moves away from the switching element 21 by a distance wherein the magnetic force becomes smaller than the force of the spring 23, the switching element 21 would be separated from the partition wall 20 by the force of the spring 23 so that the contact 22 will engage the contact 16 as shown in FIG. 3.

When the force acting upon the cylinder 25 to draw it out of the casing 14 is removed the movable element will be again brought into contact with the partition plate 20 by the action of the spring 27. Thus, the magnetic force acting upon the movable element 24 and the switching element 21 will overcome the force of the spring 23 to bring the switching element close to the partition plate to separate the contact 22 from the contact 16.

Figure 4:
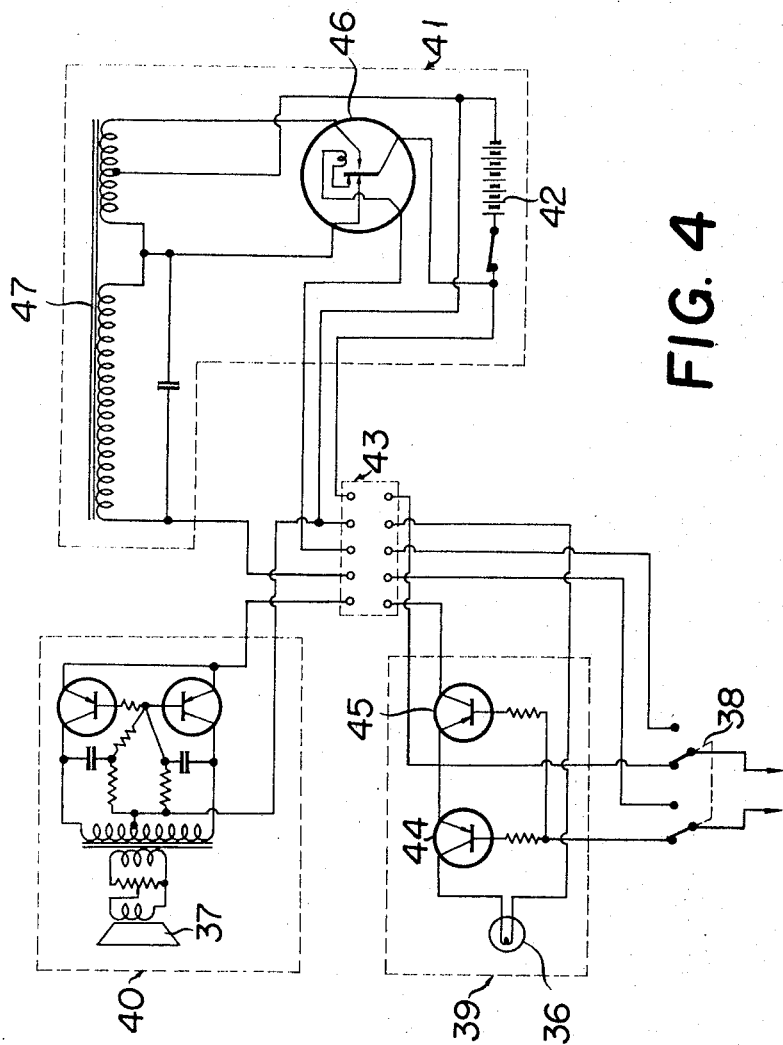
FIG. 4 is an electric connection diagram of the fishing device embodying this invention.

As schematically shown in FIG. 1, the end of the fishing line 7 to be wound upon the reel 5 is connected to an electric circuit contained in the source member 35 through a cord 34 extending through handle 6. As shown in FIG. 4, this circuit operates to energize an electric lamp 36 and a loudspeaker 37 upon closure of the contacts of the automatic switch means 11 whereby the user of the fishing rod can impart an electric shock to fish caught by the fishing hook by operating a manually operable switch to supply to the fish pulsed current through the fishing line.

FIG. 4 illustrates one example of such an electric circuit which comprises a relay circuit 39 for the lamp 36 and the loudspeaker or other audible signalling means 37, an oscillation circuit 40 responsive to the current supplied from the relay circuit 39 to generate a signal to operate the loudspeaker, and an electric source circuit 41 to generate electric pulses of the magnitude sufficient to bring the fish caught by the fishing hook 13 to the syncopic state. The source circuit 41 also includes a suitable source of supply, for examply, a storage battery 42 adapted to operate transistors 44, 45 included in the relay circuit and the oscillation circuit 40. Although not clearly shown in the drawing the source circuit 41 and the oscillation circuits 40 are contained in the source member 35 while the relay circuit 39 is mounted in a cavity in the handle 6 of the fishing pole 1, said elements being interconnected by a multi-pole switch or connector 43 and the cord 34.

When the fishing hook 13 with a bait is hung freely in a body of water together with the automatic switch means 11 by means of the fishing line 7, the contacts 16 and 22 in the automatic switch means 11 are separated so that the electrical circuit shown in FIG. 4 is opened at the free end of the fishing line 7 and is inoperative. When a fish is caught by the fishing hook, the cylinder 25 will be pulled out of the casing by the movement of the fish through the electric conductor line 12 to close contacts 16 and 22 of the switching means 11 by the motion described hereinbefore. As a consequence, two conductor wires 15 and 18 of the fishing line 7 are electrically connected through the plate 17, contacts 16 and 22, the switching element 21, lead wire 31, conductor line 12, the hook, the fish caught thereby, a body of water and the electrode 19.

Thus, a suitable potential will be applied to base electrodes of two transistors included in the relay circuit 39 from the source of supply 42 via a switch 38 and conductors in the fishing line 7. Since the emitter electrode of each of these transistors is also energized from the same source 42, current flows from the emitter electrode to the collector electrode of respective transistors when a potential is impressed upon the base electrole thereof. Switching operation of these transistors will energize the signal lamp 36 as well as the oscillation circuit 40 from the source 42 thus causing them to operate. Signals generated from the lamp 36 and the loudspeaker 37 provide a positive indication to the user of the fact that a fish is caught by the hook.

In response to such a visible or audible signal the user of the fishing rod would operate the manual switch 38 provided therefor. The switch is shown as a two-pole double-throw type adapted to impress a pulsating voltage across two conductor wires in the fishing line 7, said pulsating voltage being generated by the pulse generator 46 which is energized from the electric source 42 and the voltage of the pulsating voltage is stepped up by a transformer 47. As a result a voltage pulsating current flows between the electrode 19 on the outer periphery of the casing 14 and the hook 13 through the fish caught thereby and a body of water surrounding it to give an electric shock to the fish to bring it to the syncopic state. The circuit of the pulsating circuit thus formed is a short path through the body of water between the electrode 19 and the hook 13. Thus, in the fishing device according to this invention it is not required to increase the pulsating current generated in order to compensate for the loss of current due to a long current path extending through the body of water between the fishing hook and a ground connection as in prior fishing devices. This prevents fishes swimming about the fish caught by the hook from feeling an abnormal condition and go away from the hook. Thus, not only the catch of fish be increased, but also no shock is given to human bodies of the magnitude sufficient to endanger the user. By the same reason the physical size of the pulse generating mechanism is made substantially smaller than that of the prior devices, thus providing fishing devices easy to carry and of low cost.

What I claim is:

1. In a fishing device having an electro-conductive fishing line, said line including two insulated conductor wires; an automatic switch means connected to said fishing line and having contact members adapted to interconnect said two conductor wires through said body of water so as to complete an electric circuit when a fish is caught by a fish hook attached to said fishing line; means energized by an electric current flowing through said fishing line to give an indication to the user of the fact that a fish is caught by said hook; and a manually operable means for transmitting through said fishing line to said fish caught by said hook an electric shock to bring it to a syncopic state, said automatic switch means comprising a casing of electrical insulation interposed in said fishing line dividing said fishing line into an inner major portion and an outer minor conductor portion, said outer portion being connected to said fish hook; an electrode mounted on the periphery of said casing and connected to one of said conductor wires of said fishing line, a first contact secured in said casing and connected to the other of said conductor wires of said fishing line; a tubular member slidably arranged in said casing and connected to said outer portion at one end; a pair of opposed and mutually attracting permanent magnetic members which are movably disposed in said casing with a partition plate interposed therebetween, one of said magnetic members having a second contact which when magnetically urged toward said partition plate does not mate with said first contact, the other of said magnetic members being secured to the inner end of said tubular member and being normally magnetically biased into contact with said partition plate, first spring means urging said one magnetic member toward said first contact, an electrical path extending from said second contact on said one member through said partition plate, said other member and said tubular member to said outer line portion, second spring means also biasing said other member into contact with said partition plate, whereby when said other member is pulled away from said plate against the force of said magnetic bias and said second spring by a fish pulling on said fish hook, said one magnetic member is no longer biased toward said plate by said magnetic bias and the first spring urges said second contact on said one magnetic member into engagement with said first contact to complete an electric circuit.

References Cited

UNITED STATES PATENTS

| | | | |
|---|---|---|---|
| 648,505 | 5/1900 | Lindbohm | 43—18 |
| 1,522,471 | 1/1925 | Siino | 43—17 |
| 3,324,589 | 6/1967 | Makino et al. | 43—17 |

SAMUEL KOREN, *Primary Examiner.*

D. J. LEACH, *Assistant Examiner.*

U.S. Cl. X.R.

43—17.1